(12) United States Patent
Kottegoda et al.

(10) Patent No.: US 8,617,284 B2
(45) Date of Patent: *Dec. 31, 2013

(54) CELLULOSE BASED SUSTAINED RELEASE MACRONUTRIENT COMPOSITION FOR FERTILIZER APPLICATION

(75) Inventors: Nilwala Kottegoda, Walgama (LK); Imalka Munaweera, Walgama (LK); Lilantha Samaranayake, Walgama (LK); Sunanda Gunasekara, Walgama (LK); Ajith De Alwis, Walgama (LK); Veranja Karunaratne, Walgama (LK); A. Nadeesh Madusanka, Walgama (LK)

(73) Assignee: Sri Lanka Institute of Nanotechnology (Pvt) Ltd, Homagama (LK)

( * ) Notice: Subject to any disclaimer, the term of this patent is extended or adjusted under 35 U.S.C. 154(b) by 243 days.

This patent is subject to a terminal disclaimer.

(21) Appl. No.: 13/153,808

(22) Filed: Jun. 6, 2011

(65) Prior Publication Data

US 2011/0296887 A1    Dec. 8, 2011

Related U.S. Application Data

(60) Provisional application No. 61/351,928, filed on Jun. 7, 2010.

(51) Int. Cl.
| | |
|---|---|
| *C05C 9/00* | (2006.01) |
| *C05C 11/00* | (2006.01) |
| *C05B 17/00* | (2006.01) |
| *C05D 9/00* | (2006.01) |

(52) U.S. Cl.
USPC ............ 71/29; 71/28; 71/30; 71/31; 71/32; 71/54; 71/61; 71/64.07

(58) Field of Classification Search
USPC ............................ 71/11–63, 64.07
See application file for complete search history.

(56) References Cited

U.S. PATENT DOCUMENTS

| | | | |
|---|---|---|---|
| 2,714,553 A | 8/1955 | Bibb et al. | |
| 4,015,970 A | 4/1977 | Hennart | |
| 4,493,725 A | 1/1985 | Moon et al. | |
| 5,433,766 A * | 7/1995 | Ming et al. | 71/36 |
| 5,451,242 A * | 9/1995 | Ming et al. | 71/36 |
| 6,900,162 B2 | 5/2005 | Wertz et al. | |
| 7,165,358 B2 | 1/2007 | Wright | |
| 7,211,275 B2 | 5/2007 | Ying et al | |
| 8,361,185 B2 * | 1/2013 | Kottegoda et al. | 71/29 |
| 2004/0091417 A1 | 5/2004 | Yadav | |
| 2006/0135365 A1 | 6/2006 | Chun | |
| 2006/0243011 A1* | 11/2006 | Someus | 71/32 |

FOREIGN PATENT DOCUMENTS

EP        0 731 067 A2     9/1996

* cited by examiner

*Primary Examiner* — Wayne Langel
(74) *Attorney, Agent, or Firm* — Alston & Bird LLP (57) ABSTRACT

A macronutrient sustained release composition for a plant locus having nitrogen containing macronutrient compound adsorbed on the surface of hydroxyapatite phosphate nanoparticles, and a process for preparation thereof. The macronutrient adsorbed hydroxyapatite phosphate nanoparticles are encapsulated within cavities present in wood such that the biodegradation of the wood releases the adsorbed macronutrient compounds in a slow and sustained manner to the soil. Further, the macronutrient particles are encapsulated within the cell cavities of wood and wood is coated with cellulose modified hydroxyapatite phosphate nanoparticles such that the rupture of the nanocoating initiates the nitrogen release followed by the biodegradation of the wood releases the rest of the adsorbed macronutrient compounds in a slow and sustained manner to the soil.

20 Claims, 9 Drawing Sheets

CELLULOSE BASED SUSTAINED RELEASE MACRONUTRIENT COMPOSITION FOR FERTILIZER APPLICATION

FIELD OF THE INVENTION

The present invention relates to nitrogen containing macronutrient composition for slow and sustained release in fertilizer applications. More particularly, the present invention relates to urea derivatives that are encapsulated within a cellulose structure comprising vascular canals, intercellular spaces and cells.

BACKGROUND OF THE INVENTION

Nutrient availability in the soil-plant system is dictated by complex interactions between plant roots, soil microorganisms, chemical reactions and pathways of losses. The macronutrients required by the plant can be lost by chemical processes such as exchange, fixation, precipitation and hydrolysis, and physical processes such as leaching, runoff and volatilization. Nitrogen, phosphorus and potassium (NPK), which are required in large amounts for plants, are not adequately available in natural soils to support the sustained growth of plants. Therefore, these macronutrients (NPK) are needed to be applied externally through fertilizers. Water soluble conventional fertilizers typically result in a large amount of macronutrients being lost by leaching and evaporation. There is an increased interest in developing slow release fertilizers that release macronutrients to plants over time. Advantages of slow release fertilizers are improved efficiency and quality as the fertilizer is released over time thus providing sufficient quantities of macronutrients as required for higher crop yields. In addition, slow release fertilizers result in reduced environmental damage from leaching of macronutrients into water and emissions as gasses, compared to conventional water soluble fertilizers.

Macronutrients in fertilizers can be applied to the soil as a solid in the form of a powder or pellets or as a spray. The uptake of macronutrients by the plant needs to be compensated by their external application to the soil periodically. Nitrogen is a key macronutrient source in agriculture particularly for economic crops such as tea, rubber and coconut. Large amount of fertilizer is applied to the soil of the tea plant to improve the quality and the yield of the leaves produced. For example, a study in Japan (Yamada et al., Journal of Water and Environmental Technology, 7, 4, 331-340, 2009) reported that of the large amount of amount of nitrogen fertilizer applied to tea, only 12% of the nitrogen input was up taken by the plant and the rest was discharged to the environment.

Coconut plants require an equatorial climate with high humidity to grow. Coconut plants and trees are grown in different soil types such as laterite, coastal sandy, alluvial, and also in reclaimed soils of the marshy lowlands. One of the unique features of coconut trees and plants are that it tolerates salinity and a wide range of pH (from 5.0-8.0). In terms of fertilizer application, the amount of N, P, and K required varies according to the type of coconut plantation. In addition Mg may become important in some soils.

Therefore, one of the unsolved problems of fertilizer application is, in relation to the amounts of nitrogen applied to soil, the low Nitrogen Use Efficiency (NUE) by crops. This is because an excessive amount of nitrogen, up to 70%, is lost in conventional fertilizers due to leaching, emissions, and long-term incorporation by soil microorganisms. As such, supplying N macronutrient is critical in preventing the decline of productivity and profitability due to degradation and aging of tea plants (Kamau et al., Field Crops Research 1, 108, 60-70, 2008). Attempts to increase the NUE have so far met with little success.

US2006/0135365 discloses wood chips containing macronutrient salts for short term plant growth and release of macronutrients over a period of one week. U.S. Pat. No. 7,165,358 disclose woodchips as a substrate for macronutrients for plant growth. U.S. Pat. No. 2,714,553 disclose converting wood lignin to sugar and forming a urea-formaldehyde condensation product for macronutrient delivery. U.S. Pat. No. 6,900,162 discloses a composition containing nitrogen particles adhered by a binder degraded by soil moisture to provide for the slow release. U.S. Pat. No. 7,211,275 B2 discloses a sustained release composite of water soluble materials that are adsorbed onto an inorganic material and is released by acidic fluids in medical applications.

Solutions are needed to provide slow and sustained release macronutrient formulations for plant growth applications. Therefore, macronutrients incorporated into cavities present in wood could be used to provide slow and sustained release of macronutrients for plant growth.

SUMMARY OF THE INVENTION

Accordingly provided herein is a macronutrient delivery system that contains nitrogen containing macronutrient compound adsorbed on the surface of hydroxyapatite phosphate (HAP) nanoparticles. These macronutrient adsorbed HAP nanoparticles are encapsulated within the cavities present in wood. Alternatively, macronutrient particles have been encapsulated within the cavities present in wood followed by a thin coating of cellulose modified HAP nanoparticles. In an embodiment, nitrogen containing macronutrient compounds such as urea, thiourea, or a mixture thereof are adsorbed onto the surface of HAP nanoparticles and encapsulated within the cavities present in wood. Also disclosed herein is a process for the encapsulation of macronutrient adsorbed HAP nanoparticles/macronutrients within the cavities present in wood. The encapsulated macronutrient adsorbed nanoparticles or macronutrients encapsulated nanoparticle coated compounds prepared by this process when applied to aqueous and terrestrialenvironments released the macronutrient in a slow and sustained manner. It is believed that macronutrient adsorbed HAP nanoparticles or macronutrient particles that are included in the cavities of the wood provide for the release of the macronutrient compound in aqueous and terrestrial environments. The soil in aqueous and terrestrial environments provides the medium for transport of the macronutrients to the roots of the plant. Embodiment plants and trees include and are not limited to any crop that grows in a low pH environment (low pH crop) such as tea, rubber and coconut.

DETAILED DESCRIPTION

Nitrogen containing macronutrient composition for slow and sustained release in fertilizer applications are described in detail herein below. Fertilizers contain micro- and macronutrients that are essential for plant growth.

As referred to herein primary macronutrients are nitrogen (N), phosphorous (P), and potassium (K) while calcium (Ca), magnesium (Mg), and sulfur (S) are secondary macronutrients. All six nutrients are important for plant growth.

As referred to herein, micronutrients required in small amounts for plant growth are boron (B), chlorine (Cl), manganese (Mn), iron (Fe), zinc (Zn), copper (Cu), molybdenum (Mo) and selenium (Se).

As referred to herein sustained release of macronutrient is release in a constant and continual manner.

As referred to herein the slow release of macronutrient provides the plant with nutrients gradually over an extended period of time. Soils applied with slow release fertilizer that contain macronutrients will require less applications of such fertilizer and leads to higher efficiency of macronutrient release compared to conventional fast release fertilizers.

As referred to herein the encapsulation refers to localization of the macronutrients within cavities in the wood. Encapsulation can include covalent bonds, electrostatic bonds, Van der Waals bonds and hydrogen bonds.

Adsorption as defined herein refers to any means that forms a complex between the walls of the cavities and nitrogen containing macronutrient compound; and nitrogen containing macronutrient compound and HAP nanoparticles. Adsorption can include covalent bonds, electrostatic bonds, Van der Waals bonds and hydrogen bonds.

Urea is adsorbed on the surface of hydroxy apatite phosphate (HAP) nanoparticles. After these urea adsorbed HAP nanoparticles are encapsulated within the cavities present in a transporter medium both nitrogen and phosphorus will be released slowly.

If potassium ions are encapsulated separately into cavities of wood then they too would be released slowly.

Coating as defined herein refers to a thin layer of cellulose modified nanoparticles adsorbed onto the wood surface. Adsorption can include covalent bonds, electrostatic bonds, Van der Waals bonds and hydrogen bonds.

Plants as referred to herein include trees, seedlings and mature trees.

Transporter media as referred to herein include any media with sufficient cavities for the storage and transport of the macronutrient compound such as clays, layered double hydroxides, wood, orange peels, lemon peels, banana peels, or other lignin or cellulose containing materials.

Cavities as referred to herein include vascular canals, intercellular spaces, spaces present in clays and cells. These cavities are commonly found in wooded plants and clays. Examples of suitable wooded plants with cavities are *Gliricidia sepium* (Jacq.) Kunth ex Walp and coniferous plants such as those belonging to the family Pinaceae. The size of the cavities varies with maturity of the wooded plant. Cavities such as vascular canals, xylem and phloem, vary in size depending on the age of the wooded plant. The xylem transports water while the phloem transports nutrients and when the wooded plants are dried the aqueous nutrients present within the xylem and phloem are removed. The size of the vascular canals can range from 1 to 30 micrometer range. The intercellular spaces that are found can be in the nanoscale (i.e. below 100 nm).

Once encapsulated, these cavities will become reservoirs for storage of macronutrients.

Macronutrients in encapsulated HAP nanoparticles or macronutrients localized in vascular canals can be released early during fertilization due to the large volume of the vascular canals. Cells which are smaller in volume than vascular canals but larger than intercellular spaces can release the macronutrients at an intermediate stage during fertilization. Macronutrient in encapsulated HAP nanoparticles localized within smaller volumes of intercellular spaces may release the macronutrient at the final stages during fertilization. It is believed, not bound by any theory, that smaller cavities adsorb the macronutrient efficiently in encapsulated HAP nanoparticles on the surface walls comprising cellulose, lignin and hemi-cellulose.

Preparation of Macronutrient Adsorbed HAP Nanoparticles

HAP nanoparticles can be chemically synthesized using calcium hydroxide suspension and phosphoric acid (Mateus et al., Key Engineering Materials, 330-332, 243-246, 2007). Adsorption of nitrogen containing macronutrient compound such as urea can be facilitated by stirring the HAP nanoparticles in a concentrated urea solution. Other nitrogen containing macronutrient compounds can also be used for adsorption on the HAP nanoparticles. Such adsorbed nitrogen containing macronutrient compounds can be encapsulated within cavities present in wood or another suitable transport medium as defined herein.

Encapsulation of Macronutrient Adsorbed HAP Nanoparticles

Encapsulation of the nitrogen containing macronutrient compound adsorbed onto the surface of HAP nanoparticles into the cavities present in the wood is described herein below.

First the nitrogen containing macronutrient compound is adsorbed onto the surface of HAP nanoparticles which were prepared as described above.

Second the *G. sepium* wood was cut into pieces of approximately 1 inch in length and they were partially dried under vacuum. Finally, macronutrient compound adsorbed HAP nanoparticles were encapsulated into the partially dried *G. sepium* stem by pressurizing (1 bar-15 bar) the macronutrient compound adsorbed HAP nanoparticle dispersion into the cavities of the wood. Alternatively, macronutrient compound adsorbed HAP nanoparticle dispersion can be encapsulated into the cavities of the wood under vacuum (0-100 kPa). The percentage of N in the macronutrient compound adsorbed HAP nanoparticles encapsulated within the cavities can vary with age of the wooded plant. In an embodiment the nitrogen content of *G. sepium* wood ranged between 6-15% by weight.

Encapsulation of the nitrogen containing macronutrient compound into the cavities present in the wood and coating of the wood with cellulose modified HAP nanoparticles is described herein below.

*G. sepium* wood was cut into pieces of approximately 1 inch in length and were partially dried under vacuum. Macronutrient compound containing nitrogen was encapsulated into the partially dried *G. sepium* stem by pressurizing (1 bar-15 bar) a saturated solution of nitrogen containing macronutrient into the cavities of the wood. The micronutrient encapsulated wood was then coated by dipping or spraying with cellulose modified HAP nanoparticles.

The percentage of N in the macronutrient compound adsorbed HAP nanoparticles encapsulated within the cavities can vary with age of the wooded plant. In an embodiment the nitrogen content of *G. sepium* wood ranged between 10-20% by weight.

Release Behavior in Soils

In certain embodiments a uniform release of nitrogen over a period up to 3 months is observed. During fertilization of tea plants, the frequency of application can be attenuated depending on the fertilizer requirement of a given tea plantation. This can be done by starting a second round of application at a suitable period prior to reaching the end of the first application of the macronutrient adsorbed HAP nanocomposite. In another embodiment, multiple applications of the HAP nanocomposite are distributed on acidic soils within three months. In another embodiment soil found at about 4000 feet in tea plantations, for example from Thalawakelai, Sri Lanka, can be used for slow and sustained release of the nitrogen containing macronutrient. In another embodiment soil found at about 1600 feet in tea plantations, for example from Kandy, Sri Lanka, can be used for slow and sustained release of the nitrogen containing macronutrient.

Sandy soils are suitable for coconut growth and in an embodiment the encapsulated macronutrient releasing nitrogen can be used for fertilization. Further, in an embodiment, the encapsulated macronutrient can be used to fertilize rubber plants and trees.

Organic matter content of soil between 1600 to 4000 feet elevation can range from 2 to 3%. In general, higher elevations contain more organic matter compared to lower elevations such as sea level. Such high organic matter could lead to lowering of pH of the soil. The macronutrient encapsulated wood cavities are superabsorbent bio polymers such as cellulose, hemi-cellulose and lignin. Such superabsorbent bio polymers absorb moisture in large amounts and initiates microbial degradation when in contact with soils. Acidic products are formed due to the microbial degradation, and encapsulated macronutrients are released.

In an embodiment, low phosphorous release behavior indicates that P may be released slower than the depletion of nitrogen during the three month period.

This may be the result of HAP nanoparticles being held tightly within the cavities compared to the adsorbed urea. In an embodiment K can exhibit slow and sustained release over the three months period.

EXAMPLES

Example 1

Preparation of HAP Nanoparticles

HAP nanoparticles were synthesized by drop wise addition of phosphoric acid (250 ml of 0.6 M) into a suspension of calcium hydroxide (19.29 g/250 ml). The reaction was carried out under mechanical stirring (1000 rpm). The reaction takes place according to the following equation.

$$6H_3PO_4+10Ca(OH)_2 \rightarrow Ca_{10}(PO_4)_6(OH)_2+18H_2O$$

HAP nanoparticles synthesized as described above were allowed to settle and the supernatant was decanted. This process was repeated three times using distilled water to purify the product. The solid obtained was dried at 100° C. for two hours to provide 25 g of HAP nanoparticles which were characterized using XRD, SEM/EDX, AFM and FTIR.

As seen from FIG. 1, the XRD pattern indicated that the synthesized HAP nanoparticles were identical to a commercial sample obtained from Sigma Aldrich Chemical Company, USA. No other peaks were observed confirming the absence of any other crystalline impurities. As evidenced by EDX spectra, the presence of Ca and P was confirmed. As seen from FIG. 2, SEM images of HAP nanoparticles, exhibited needle like morphology with a diameter less than 30 nm. AFM images corroborated the uniform particle size. The particle size distribution was also confirmed by the particle size measurements done using a Malvern, nanoZS, ZEN 3600.

FTIR spectrum further confirmed the presence of HAP nanoparticles and the peak assignments are given in Table 1 below:

TABLE 1

FTIR peak assignments for HAP nanoparticles

| Wavenumber/$cm^{-1}$ | Peak assignment |
|---|---|
| 1080-1020 | P—O stretching of $PO_4^{3-}$ |
| 3600-3580, 633 | O—H stretching |
| 1640 | O—H bending of adsorbed water |

Example 2

Synthesis of Urea Adsorbed HAP Nanoparticles

HAP nanoparticles synthesized as described in Example 1 were treated with 250 ml of 1M urea solution. The solution was stirred mechanically at 750 rpm for 12 hours. In another experiment the solution was subjected to ultrasonic mixing at 30 kHz for 45 minutes. The excess liquid was decanted and the product was washed to remove the excess urea.

The product was characterized using XRD, SEM/EDX and FTIR. As seen in FIG. 3, XRD pattern of the urea adsorbed HAP nanoparticles indicated the presence of peaks due to HAP, and an extra peak that was attributed to the adsorbed urea.

FIG. 4 represents the SEM image of urea adsorbed HAP nanoparticles; the particle size and the morphology of the HAP nanoparticles were not significantly changed by surface adsorption of urea.

Table 2 represents FTIR data obtained for urea, HAP nanoparticles and urea adsorbed HAP nanoparticles.

As seen from Table 2, N—H stretching frequency of pure urea appears as a doublet at 3430 $cm^{-1}$ and 3340 $cm^{-1}$ and once urea is bonded to HAP nanoparticles it gives rise to a noticeable shift to 3300 $cm^{-1}$. This shift reveals that the $NH_2$ groups of urea are bonded to OH groups of HAP nanoparticles via H-bonding. This can be confirmed further by the peak broadening in the corresponding N—H stretching frequencies of urea. The band at 1590 $cm^{-1}$ for the N—H bending motion was still present although shifted to 1627 $cm^{-1}$ for urea adsorbed HAP nanoparticles. This indicates the presence of free unbound $NH_2$ groups even after adsorption of urea onto the HAP nanoparticles. The relatively free $NH_2$ groups may be held within the encapsulated structure and may be released at the early stages during fertilization.

TABLE 2

FTIR peak assignment for urea, HAP nanoparticles and urea adsorbed HAP nanoparticles.

| Wavenumber/ cm$^{-1}$ | Urea | Wavenumber/ cm$^{-1}$ | HAP nanoparticles | Wavenumber/ cm$^{-1}$ | Urea adsorbed HAP nanoparticles |
|---|---|---|---|---|---|
| 3430, 3340 doublet | N—H stretching | | | ~3300 broad | N—H/O—H stretching |
| 1680 | carbonyl stretching | | | 1666 | carbonyl stretching |
| 1590 | N—H | | | 1627 | N—H bending |
| 1460 | N—C—N stretching | | | 1446 | N—C—N stretching |
| | | 1030 | P—O stretching of PO$_4^3$ | 1030 | P—O stretching of PO$_4^3$ |
| | | 3500, 633 | O—H stretching | 3300 broad | O—H stretching |
| | | 3350-3550 | adsorbed or bound water | 3350-3550 | adsorbed or bound water |
| | | 1640 | O—H bending | 1627 | O—H bending |

The carbonyl stretching frequency of pure urea appears at 1680 cm$^{-1}$ while the corresponding peak for urea adsorbed HAP nanoparticles is at 1666 cm$^{-1}$. There is a clear shift in stretching frequency of the carbonyl group for urea adsorbed HAP nanoparticles indicating that urea is bonded to HAP nanoparticles through the carbonyl group. This can be further confirmed by a noticeable peak shift of the N—C—N stretching frequency (1460 cm$^{-1}$) of urea to a lower frequency in urea adsorbed HAP nanoparticles (1446 cm$^{-1}$).

Urea may be adsorbed on the surface of HAP by several binding modes of unequal binding strengths. This can give rise to different binding environments when encapsulated within the cavities of wood, giving rise to different patterns of release behavior when contacted with soils.

According to the elemental analysis, the urea adsorbed HAP nanoparticles contained 14%; C, 5%; H, 33%; N and 6%; P.

Figure 1:
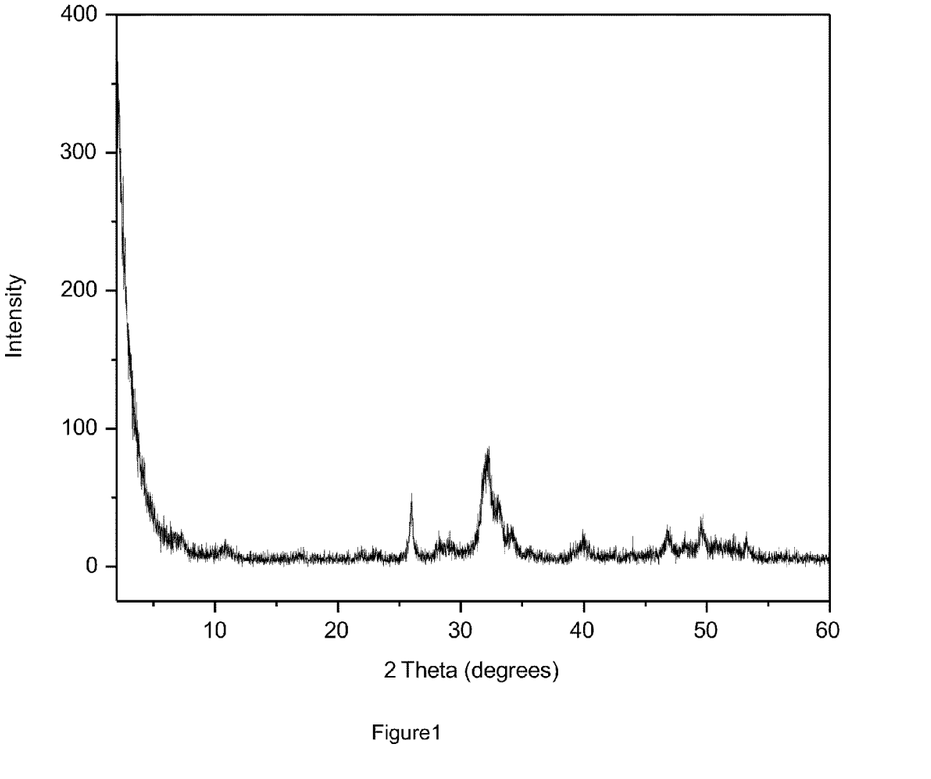
FIG. 1. XRD pattern of synthesized HAP nanoparticles
Figure 2:
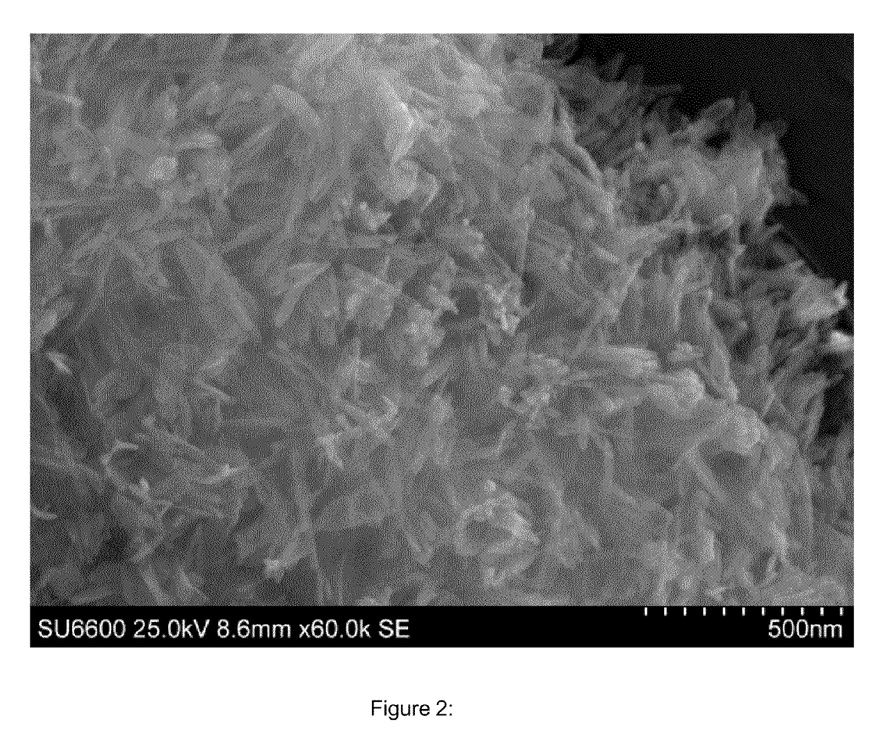
FIG. 2. SEM images of synthesized HAP nanoparticles
Figure 3:
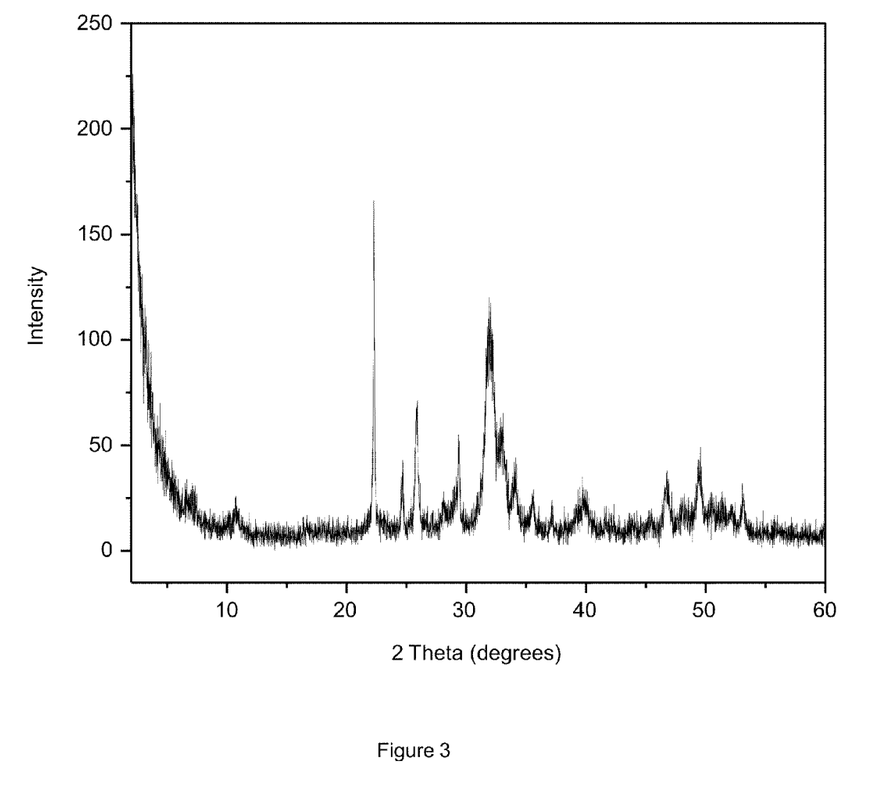
FIG. 3. XRD pattern of the urea adsorbed HAP nanoparticles
Figure 4:
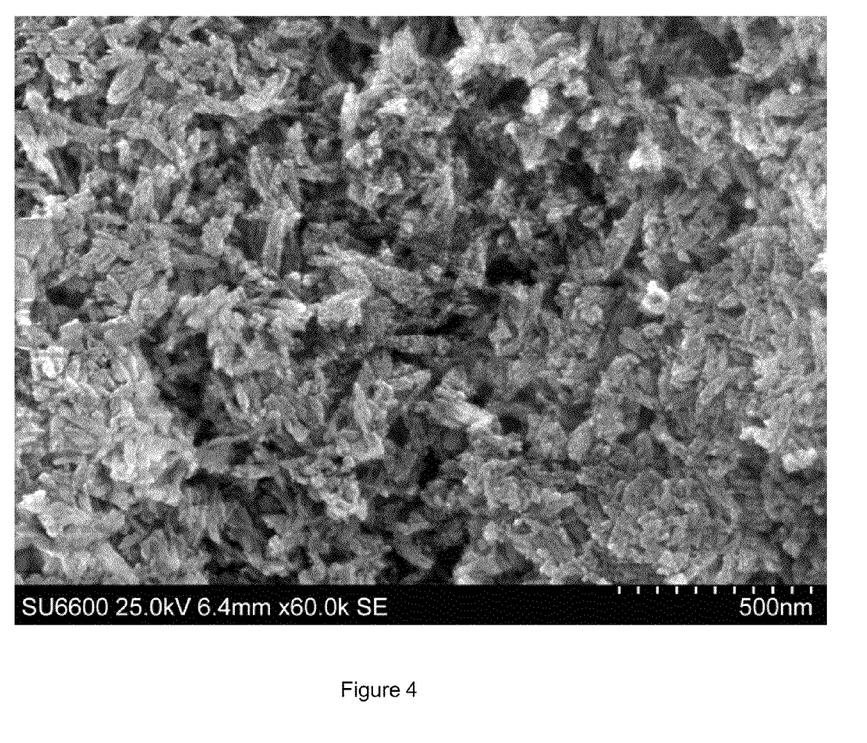
FIG. 4. SEM image of urea adsorbed HAP nanoparticles
Figure 5:
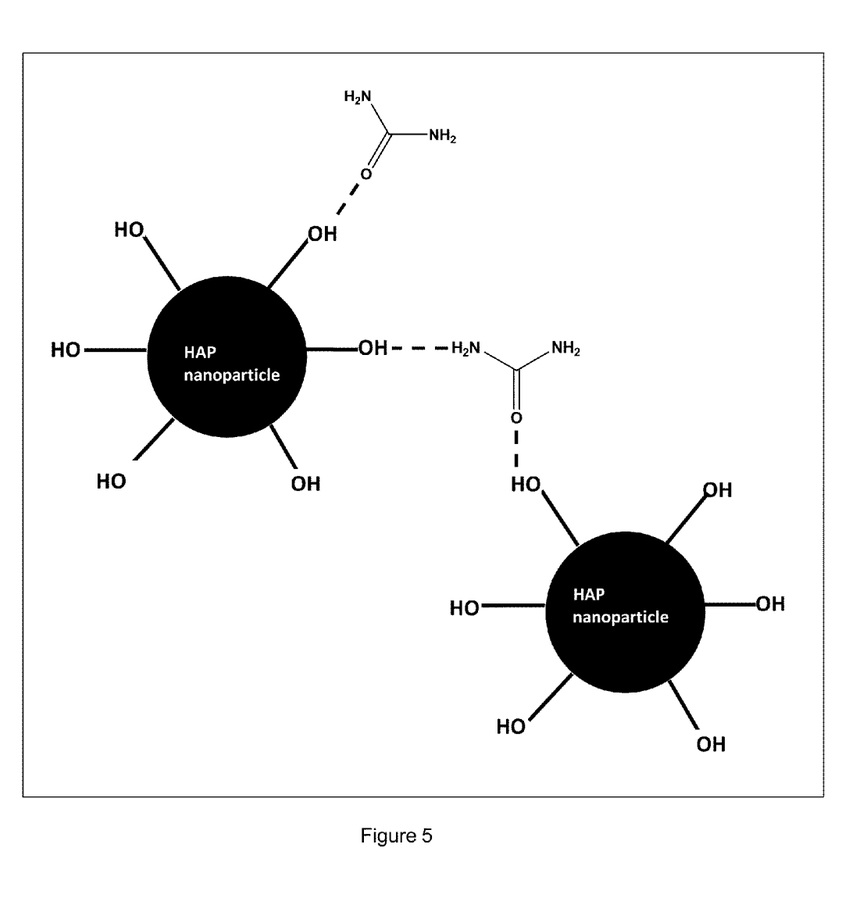
FIG. 5. Schematic representation of the possible structure of the urea adsorbed HAP nanoparticles FIG. 6. Optical microscopic image of stem cross section of *G. sepium*

Schematic representation (not drawn to scale) of the structure of the urea adsorbedHAP nanoparticles is given in FIG. 5.

Example 3

Encapsulation of Urea Adsorbed HAP Nanoparticles into the Cavities G. sepium

First, G. sepium wood was cut into 1-5 cm pieces and vacuum dried at 0.5 bar for 1 hr. The vacuum dried G. sepium pieces were soaked in excess amount of a dispersion made from urea adsorbed HAP nanoparticles. This system was subjected to a pressure of 1 kg cm$^{-2}$ for 2-24 hrs. The pressure treated G. sepium pieces were oven dried at 50° C. for 5 hrs and characterized using NPK elemental analysis, SEM and FTIR.

The presence of nitrogen in G. sepium was confirmed by NPK analysis, 6%; N, 1%; P. The NPK analysis of untreated G. sepium was 1.26%; N, 0.29%; P and 1.79%; K.

Figure 6:
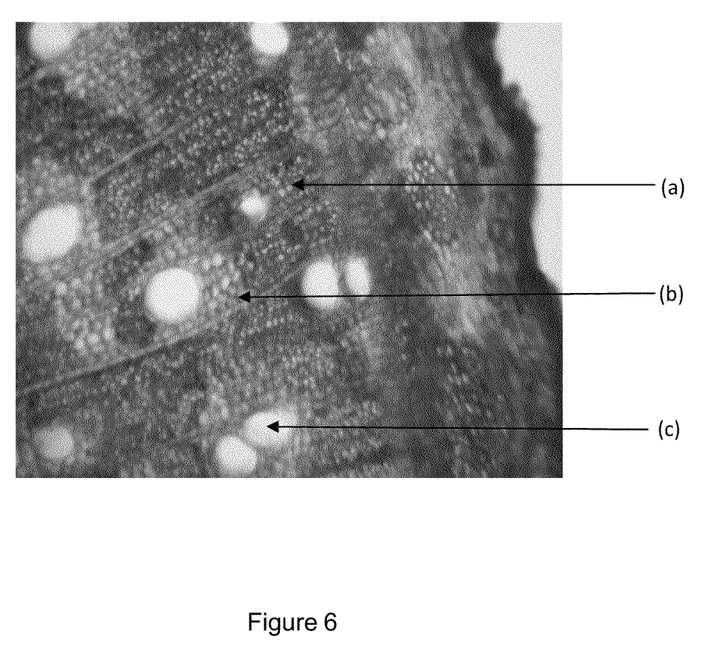

As seen from FIG. 6, the optical micrograph of the G. sepium wood showed the highly porous structure. In FTIR, the characteristic peaks of HAP nanoparticles, phosphate stretching vibrations around 1050 cm$^{-1}$, water bending motions 1680 cm$^{-1}$, and the broad hydroxyl stretching peak are found in urea adsorbed HAP nanoparticle encapsulated G. sepium wood confirming the presence of HAP nanoparticles within the cells. The characteristic doublet in the urea stretching frequency around 3500 cm$^{-1}$ appears as one broad single peak suggesting a chemical bonding environment of urea within the cells of the G. sepium wood.

Example 4

Encapsulation of Urea into the Cavities G. sepium and Coating with HAP Nanoparticles First, G. sepium wood was cut in to 1-5 cm pieces and vacuum dried at 0.5 bar for 1 hr. The vacuum dried G. sepium pieces (300 g) were soaked in a saturated urea solution (450 g of urea in 2 L of water). This system was subjected to a pressure of 1 kg cm$^{-2}$ for 2 hrs. The pressure treated G. sepium pieces were oven dried at 50° C. for 5 hrs and characterized using NPK elemental analysis, SEM and FTIR.

Secondly, a surface coating of cellulose modified HAP nanoparticles was applied on urea encapsulated G. Sepium wood. HAP nanoparticles prepared as above was mixed with carboxymethyl cellulose (CMC) solution (50 g CMC in 250 ml water) by dipping. Cellulose modified HAP nanoparticle coated G. Sepium wood was dried at 50° C. for four hours.

The presence of nitrogen in G. sepium was confirmed by N and P analysis, 16%; N, 1%; P. The NPK analysis of untreated G. sepium was 1.26%; N, 0.29%; P and 1.79%; K.

Example 5

Release Kinetics of Urea Adsorbed HAP Nanoparticles Encapsulated G. sepium Wood and Commercial Fertilizer Three soil samples (1000 g each of (a) sandy soil found at sea level; (b) soil found at an elevation of 1600 feet in a tea plantation; and (c) soil found at an elevation of 4000 feet in a tea plantation) were each mixed with 20 g of commercial fertilizer formulation for tea (T 65); the T65 formulation contained urea (N 11%), super phosphate (P 11%) and potash (K 11%); and was purchased from Hayleys Agro Ltd., Colombo, Sri Lanka.

These three soil samples containing commercial T65 fertilizer was filled into three glass columns. Similarly, three equal amounts of urea adsorbed HAP nanoparticles encapsulated G. sepium wood and urea adsorbed G. Sepium wood coated with cellulose modified HAP nanoparticles having an NPK content similar as those used in the commercial samples, were taken separately and filled into three glass columns containing three soil samples (a), (b) and (c) as described above. Next, 180 ml water was added to all six soil columns until they reached the soil water saturation point, and maintained the water content approximately constant throughout the period of study. Water (100 ml) was added at five day intervals prior to elution. The eluted solutions (50 ml) were collected for NPK analysis. NPK analysis was done by Kjeldhal (N), vanadamolybdate (P) and flame photometry (K).

Figure 7:
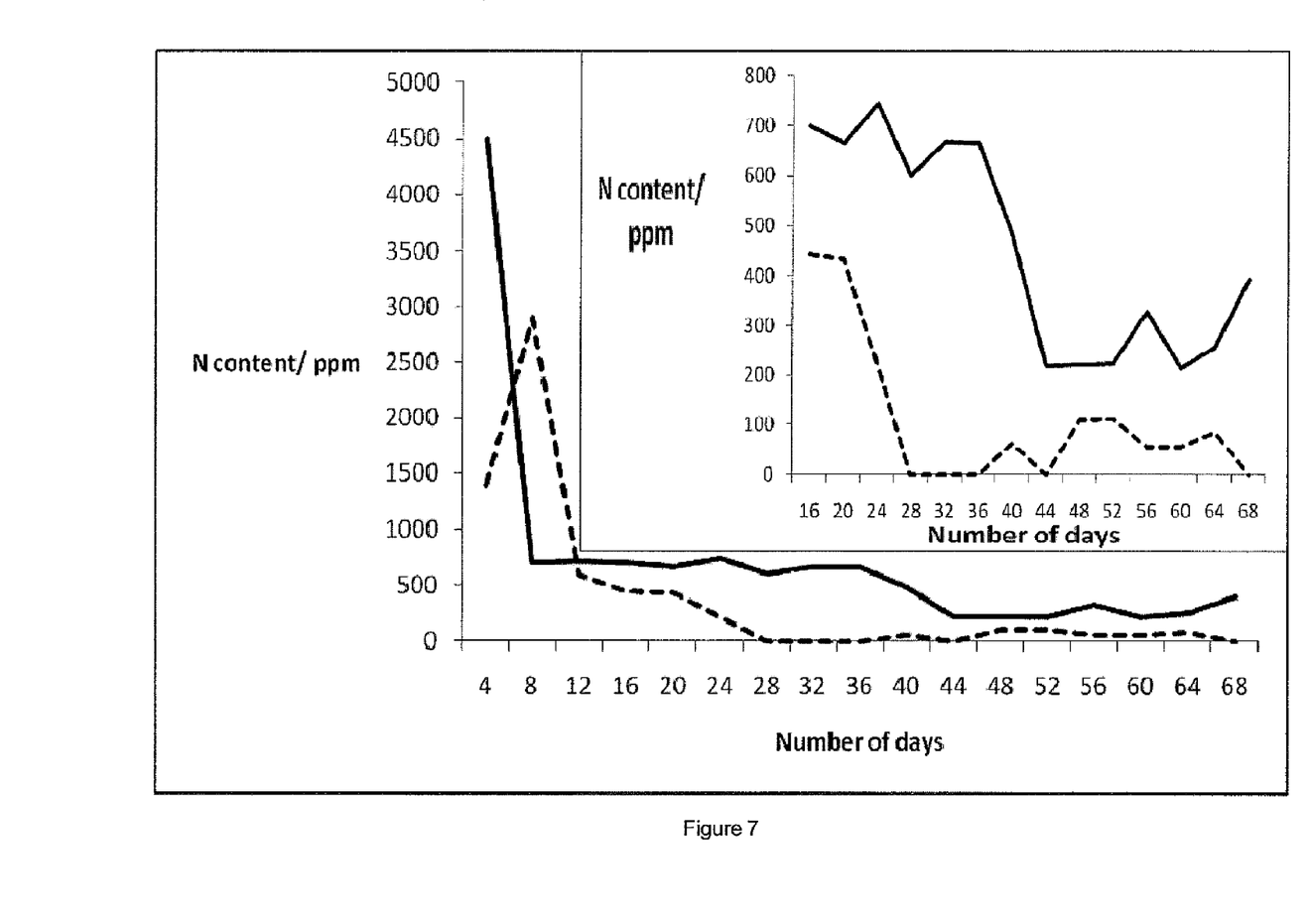
FIG. 7. N release kinetics for soil from sandy soil (a) fertilizer composition based on urea adsorbed HAP nanoparticles encapsulated within cavities of *G. sepium* (b) Commercial fertilizer FIG. 8. N release kinetics for soil at an elevation of 1600 feet (a) fertilizer composition based on urea adsorbed HAP nanoparticles encapsulated within cavities of *G. sepium* (b) Commercial fertilizer FIG. 9. N release kinetics for soil at an elevation of 4000 feet (a) fertilizer composition based on urea adsorbed HAP nanoparticles encapsulated within cavities of *G. sepium* (b) Commercial fertilizer
Figure 8:
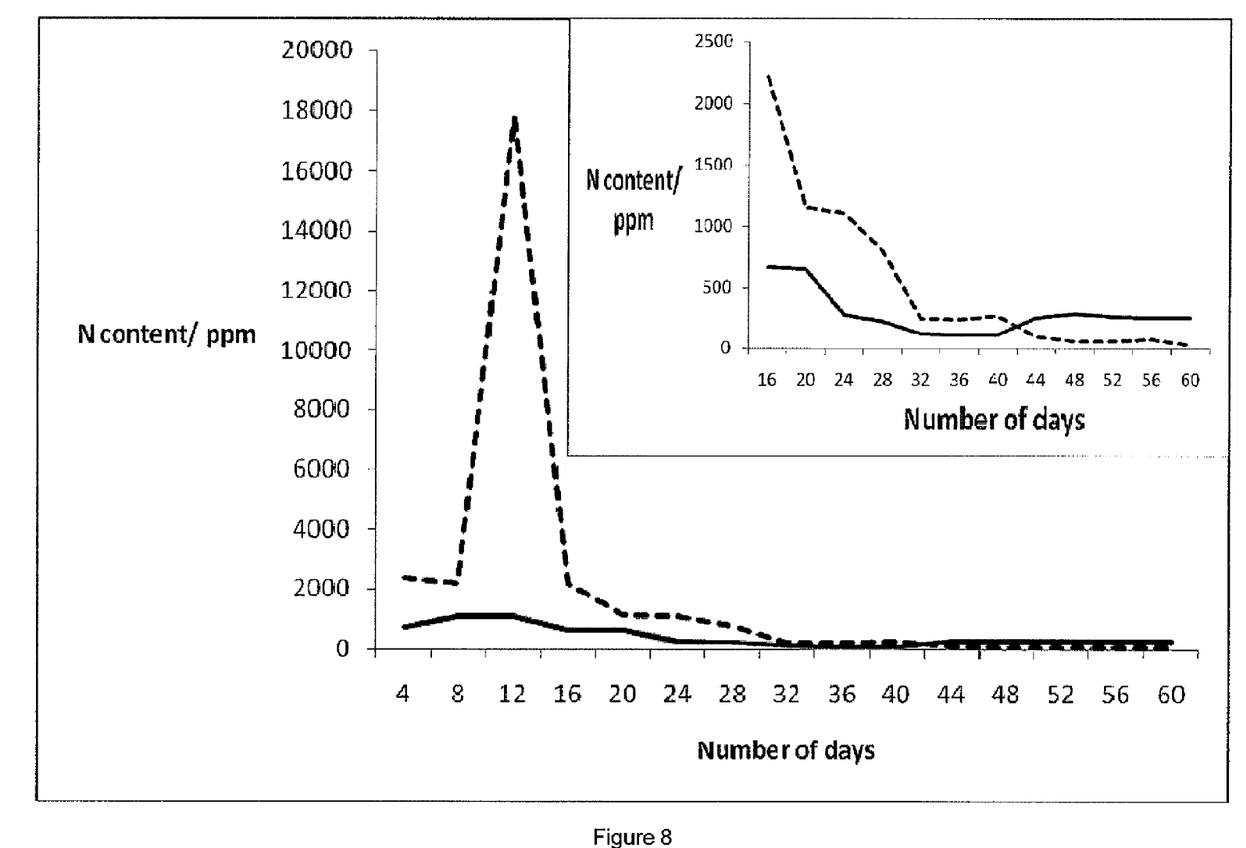
Figure 9:
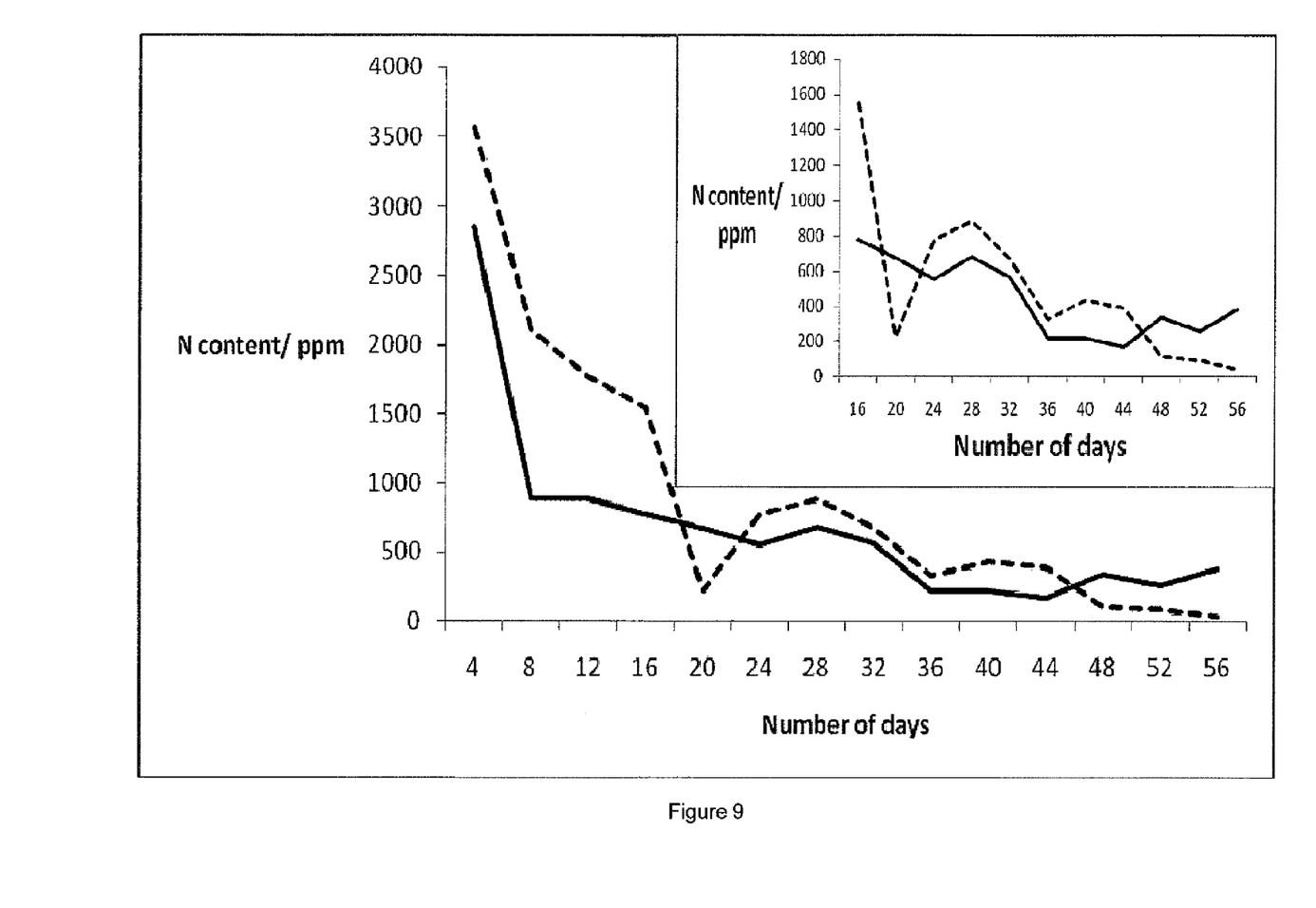

The N release kinetics is shown in FIGS. 7 through 9. As shown in FIGS. 7 through 9, on day 55 the macronutrient adsorbed HAP nanoparticles encapsulated within cavities of the transporter medium are still releasing at a slow and sustained manner such that at least 100 ppm of nitrogen was being released into the soil, whereas the amount of nitrogen released by the commercial fertilizer at this time is less.

A slow and sustained release of N over a period of 2 months for both the acidic soils at elevations of 1600 feet (pH of 4.7) and 4000 feet (pH of 5.2) and sandy soil (pH 7) was observed. Fluctuations in the N release kinetics are observed in the columns which contained commercial fertilizer. This was attributed a release of a large quantity during the first two weeks followed by the release of very low quantities until about day 30 and subsequent depletion to negligible amounts (see FIGS. 7 to 9). The Nitrogen release conditions at soils at an elevation of 1600 feet and 4000 feet and the sandy soil at sea level indicated the sustained release behavior even after 30 days.

The P release amounts were less than optimal levels required for all three types of soils.

The invention claimed is:

1. A macronutrient sustained release composition comprising:
   a. a macronutrient compound adsorbed on the surface of a hydroxyapatite phosphate nanoparticle; and
   b. a medium containing cellulose, lignin, or a combination thereof having a plurality of cavities, wherein said nanoparticle is dispersed within the cavities of said medium.
2. The composition of claim 1 wherein the medium is coated with cellulose modified hydroxyapatite phosphate nanoparticles.
3. The composition of claim 1 wherein said macronutrient compound comprises nitrogen.
4. The composition of 1 wherein said macronutrient compound is urea.
5. The composition of 1 wherein the plant locus is a low pH crop.
6. The composition of claim 1 wherein the macronutrient compound comprises urea, thiourea or a mixture thereof.
7. The composition of claim 1 wherein the macronutrient adsorbed hydroxyapatite phosphate nanoparticles have an average particle diameter less than 30 nm.
8. The composition of claim 2 wherein the cellulose modified hydroxyapatite phosphate nanoparticles have an average particle diameter less than 30 nm.
9. The composition of claim 1 wherein adsorbed macronutrient compounds have a release profile wherein at day 55, at least 100 ppm/20 g (composition) of a nitrogen macronutrient is being released into the soil.
10. The composition of claim 2 wherein adsorbed macronutrient compounds have a release profile wherein at day 55, at least 100 ppm/20 g (composition) of a nitrogen macronutrient is being released into the soil.
11. The composition of claim 1 wherein said macronutrient compound comprises nitrogen, phosphorous, and potassium.
12. The composition of claim 1 wherein said macronutrient compound comprises nitrogen and phosphorous.
13. A process for preparing a macronutrient sustained release composition comprising;
   a. providing hydroxyapatite phosphate nanoparticles and a medium containing cellulose, lignin, or a combination thereof having cavities;
   b. contacting the hydroxyapatite phosphate nanoparticles with a macronutrient to form macronutrient adsorbed on the surface of hydroxyapatite phosphate nanoparticles; and
   c. encapsulating the macronutrient adsorbed on the surface of hydroxyapatite phosphate nanoparticles within the cavities present in medium containing cellulose, lignin, or a combination thereof.
14. A process for preparing a macronutrient sustained release composition according to claim 13 wherein the macronutrient encapsulated medium is coated with cellulose modified hydroxyapatite phosphate nanoparticles.
15. A method of macronutrient sustained release to a plant locus comprising:
   a. providing an encapsulate having a macronutrient compound adsorbed on the surface of hydroxyapatite phosphate nanoparticles, wherein the macronutrient adsorbed hydroxyapatite phosphate nanoparticles are encapsulated within the cavities present in a medium containing cellulose, lignin, or a combination thereof;
   b. contacting said encapsulate with a soil; and
   c. releasing the macronutrient compound adsorbed on the surface of the hydroxyapatite phosphate nanoparticles in a slow and sustained manner to the soil.
16. A method of macronutrient sustained release to a plant locus according to claim 15 wherein the medium containing cellulose, lignin, or a combination thereof is coated with cellulose modified hydroxyapatite phosphate nanoparticles.
17. The method of claim 15 further comprising repeating steps a and b within a period of three months.
18. The method of claim 16 further comprising repeating steps a and b within a period of three months.
19. The method of claim 15 wherein the plant locus is a low pH crop.
20. The method of claim 16 wherein the plant locus is a low pH crop.

* * * * *